US012389240B2

(12) United States Patent
Veit et al.

(10) Patent No.: US 12,389,240 B2
(45) Date of Patent: Aug. 12, 2025

(54) COMMUNICATION SYSTEM AND OPERATING METHOD

(71) Applicant: NXP B.V., Eindhoven (NL)

(72) Inventors: David Veit, Graz (AT); Dorian Haslinger, Nestelbach bei Graz (AT)

(73) Assignee: NXP B.V., Eindhoven (NL)

( * ) Notice: Subject to any disclaimer, the term of this patent is extended or adjusted under 35 U.S.C. 154(b) by 414 days.

(21) Appl. No.: 17/936,879

(22) Filed: Sep. 30, 2022

(65) Prior Publication Data

US 2024/0129754 A1 Apr. 18, 2024

(30) Foreign Application Priority Data

Nov. 1, 2021 (EP) .................................. 21205829

(51) Int. Cl.
*H04W 24/00* (2009.01)
*H04W 24/02* (2009.01)
(Continued)

(52) U.S. Cl.
CPC ......... *H04W 24/02* (2013.01); *H04W 64/003* (2013.01); *H04B 1/7163* (2013.01); *H04W 84/12* (2013.01)

(58) Field of Classification Search
CPC ........................... H04W 24/02; H04W 64/003
See application file for complete search history.

(56) References Cited

U.S. PATENT DOCUMENTS 10,559,149 B1 * 2/2020 Kuechler ........... G07C 9/00309
10,573,104 B2 * 2/2020 Jain ...................... G01S 13/765
(Continued)

FOREIGN PATENT DOCUMENTS

CN 108900974 A 11/2018
EP 4174804 A1 * 5/2023 ........... G01S 13/765
(Continued)

OTHER PUBLICATIONS

IEEE Std 802.15.4z™-2020 (Amendment to IEEE Std 802.15.4 ™—2020), "IEEE Standard for Low-Rate Wireless Networks Amendment 1: Enhanced Ultra Wideband (UWB) Physical Layers (PHYs) and Associated Ranging Techniques", IEEE SA Standards Board, Jun. 4, 2020.
(Continued)

*Primary Examiner* — Erika A Washington

(57) ABSTRACT

In accordance with a first aspect of the present disclosure, a communication system is provided, comprising: a plurality of communication nodes which are operatively coupled to each other, wherein each of said communication nodes comprises a first radio frequency (RF) communication unit configured to perform ranging sessions with an external communication device; a controller configured to create a logical subset of said communication nodes based on an indication of a channel quality between the communication nodes and the external communication device, wherein said indication of the channel quality has been obtained using a second RF communication unit comprised in each of said communication nodes; the controller further being configured to cause that only the communication nodes included in said logical subset perform said ranging sessions with the external communication device.

18 Claims, 4 Drawing Sheets

(51) Int. Cl.
*H04W 64/00* (2009.01)
*H04B 1/7163* (2011.01)
*H04W 84/12* (2009.01)

(56) References Cited

U.S. PATENT DOCUMENTS

| | | |
|---|---|---|
| 11,212,642 B2 | 12/2021 | Ledvina et al. |
| 2019/0324479 A1 | 10/2019 | Gitosh et al. |
| 2020/0228943 A1 | 7/2020 | Martin et al. |
| 2020/0348409 A1 | 11/2020 | McLaughlin et al. |
| 2021/0011143 A1 | 1/2021 | Naiki et al. |
| 2021/0112548 A1 | 4/2021 | De Perthuis et al. |
| 2021/0245707 A1 | 8/2021 | Golsch et al. |
| 2022/0099816 A1 | 3/2022 | Eber et al. |
| 2023/0075008 A1* | 3/2023 | Cooper ................. G01S 5/0278 |

FOREIGN PATENT DOCUMENTS

| | | |
|---|---|---|
| KR | 20180042546 A | 4/2018 |
| KR | 20190064393 A | 6/2019 |

OTHER PUBLICATIONS

Dai, W., "On the Minimum Number of Active Anchors for Optimal Localization", Globecom 2012—Wireless Communications Symposium, Dec. 3-7, 2012.

Istomin, T., "Janus: Efficient and Accurate Dual-radio Social Contact Detection", IEEE Communications Magazine, Jan. 5, 2021.

Wang, S., "Antenna Cluster Selection for Localization—Communication Dual Mode Operation", 2016 IEEE 27th Annual IEEE International Symposium on Personal, Indoor and Mobile Radio Communications—(PIMRC): Mobile and Wireless Networks, Sep. 4-8, 2016.

* cited by examiner

COMMUNICATION SYSTEM AND OPERATING METHOD

CROSS-REFERENCE TO RELATED APPLICATIONS

This application claims the priority under 35 U.S.C. § 119 of European Patent application no. 21205829.1, filed on 1 Nov. 2021, the contents of which are incorporated by reference herein.

TECHNICAL FIELD

The present disclosure relates to a communication system. Furthermore, the present disclosure relates to a corresponding method of operating a communication system, and to a computer program for carrying out said method.

BACKGROUND

Ultra-wide band (UWB) is a technology that uses a high signal bandwidth, in particular for transmitting digital data over a wide spectrum of frequency bands with very low power. For example, ultra-wideband technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

SUMMARY

In accordance with a first aspect of the present disclosure, a communication system is provided, comprising: a plurality of communication nodes which are operatively coupled to each other, wherein each of said communication nodes comprises a first radio frequency (RF) communication unit configured to perform ranging sessions with an external communication device; a controller configured to create a logical subset of said communication nodes based on an indication of a channel quality between the communication nodes and the external communication device, wherein said indication of the channel quality has been obtained using a second RF communication unit comprised in each of said communication nodes; the controller further being configured to cause that only the communication nodes included in said logical subset perform said ranging sessions with the external communication device.

In one or more embodiments, the first RF communication unit is an ultra-wideband (UWB) communication unit or a Wi-Fi communication unit.

In one or more embodiments, the second RF communication unit is a low-power communication unit, in particular a Bluetooth low energy (BLE) communication unit, an ultra-high frequency (UHF) communication unit, or a low frequency (LF) communication unit.

In one or more embodiments, one of said communication nodes comprises the controller.

In one or more embodiments, the controller is configured to create said logical subset by comparing channel quality indicators provided by all communication nodes, and by including in said logical subset only communication nodes that have provided high channel quality indicators.

In one or more embodiments, the communication nodes are configured to apply a normalization function to the channel quality indicators before providing said channel quality indicators to the controller.

In one or more embodiments, if one or more channel quality indicators are equivalent, the controller is configured to include all communication nodes that have provided said equivalent channel quality indicators in the logical subset.

In one or more embodiments, if one or more channel quality indicators are equivalent, the controller is configured to include none of the communication nodes that have provided said equivalent channel quality indicators in the logical subset.

In one or more embodiments, if one or more channel quality indicators are equivalent, the controller is configured to include randomly selected communication nodes that have provided said equivalent channel quality indicators in the logical subset.

In one or more embodiments, the indication of the channel quality is based on at least one of the following parameters: a received signal strength indicator; statistics or parameters characteristic for the communication channel; ranging results obtained using the second RF communication unit; a connection status between the communication nodes and the external communication device; a bit error rate.

In one or more embodiments, the controller is configured to create said logical subset using a configurable parameter M, wherein M is a number of communication nodes to be included in said logical subset and wherein M is smaller than or equal to the total number of communication nodes in the system.

In accordance with a second aspect of the present disclosure, a method of operating a communication system is conceived, the system comprising a plurality of communication nodes which are operatively coupled to each other and a controller, wherein each of said communication nodes comprises a first radio frequency (RF) communication unit, the method comprising: creating, by the controller, a logical subset of said communication nodes based on an indication of a channel quality between the communication nodes and an external communication device, wherein said indication of the channel quality has been obtained using a second RF communication unit comprised in each of said communication nodes; causing, by the controller, that only communication nodes included in said logical subset perform ranging sessions with the external communication device, wherein said ranging sessions are performed by the first RF communication unit.

In one or more embodiments, the first RF communication unit is an ultra-wideband (UWB) communication unit or a Wi-Fi communication unit.

In one or more embodiments, the second RF communication unit is a low-power communication unit, in particular a Bluetooth low energy (BLE) communication unit, an ultra-high frequency (UHF) communication unit, or a low frequency (LF) communication unit.

In accordance with a third aspect of the present disclosure, a computer program is provided, comprising executable instructions which, when executed by a system of the kind set forth, cause said system to carry out a method of the kind set forth.

DESCRIPTION OF DRAWINGS

Embodiments will be described in more detail with reference to the appended drawings, in which.

DESCRIPTION OF EMBODIMENTS

As mentioned above, ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

Accordingly, UWB technology may be used to measure the distance between a UWB communication device whose position should be tracked (for example, a mobile device that functions as a key for accessing a vehicle or opening a door) and one or more UWB communication devices which are used to track said position (for example, UWB anchors embedded in a vehicle or a door). Typically, distance measurements are performed during UWB communication sessions referred to as a ranging sessions. Usually, the UWB communication device whose position should be tracked acts as an initiator in such a ranging session, while the UWB communication devices which are used to track said position act as responders. Together, the UWB communication devices which are used to track the position may be referred as a localization system. However, the power consumption of such a localization system may be high. Alternatively, Wi-Fi communication technology may be used for distance estimations. Also in that case the power consumption of the localization system may be high.

For example, UWB-based vehicle access systems may enable an accurate localization of a key fob, which in turn enables a multitude of different use cases. However, to ensure this high localization accuracy also in harsh environments, vehicle manufacturers typically install approximately 8 to 10 anchors in the vehicles. Using all of these anchors results in a significant power consumption. Furthermore, if the number of UWB-equipped vehicles increases, interference will most likely become a bigger challenge. Therefore, it may become important to develop methods that do not only maximize the localization accuracy of a system, but also the efficiency in terms of power consumption and airtime. To achieve the first goal of reduced power consumption, approaches that do not add additional complexity—which often goes hand in hand with an increased power consumption—are favorable.

Now discussed are a communication system and a corresponding method of operating a communication system, which facilitate reducing the power consumption without significantly increasing the system complexity. The communication system may for example be implemented as a localization system of the kind set forth above.

Figure 1:
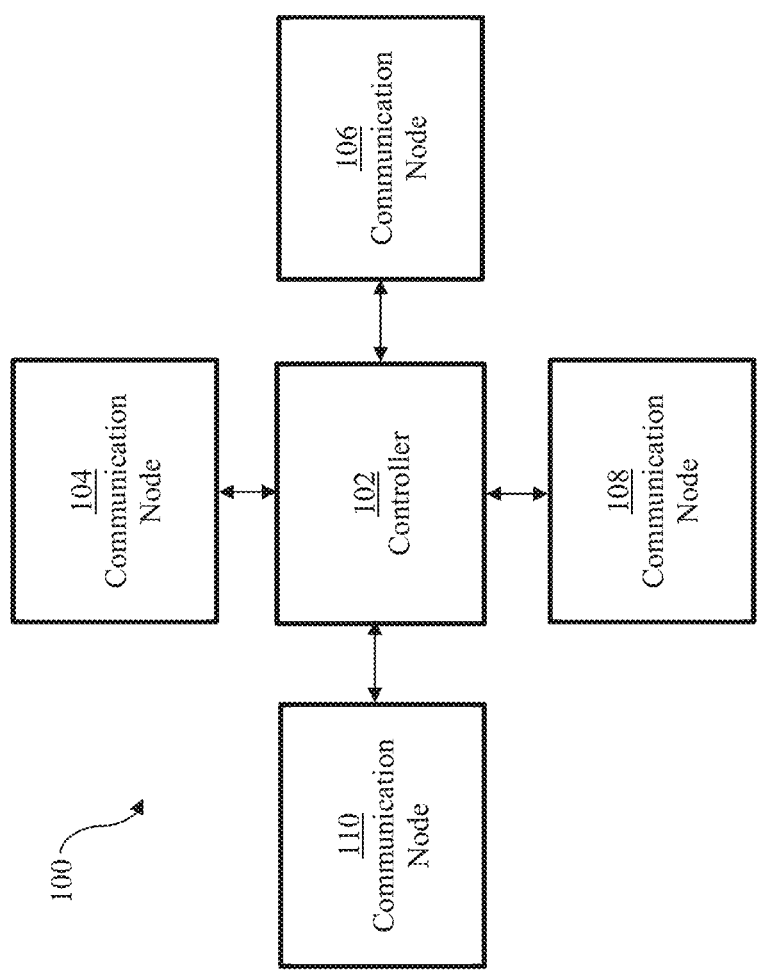
FIG. 1 shows an illustrative embodiment of a communication system.

FIG. 1 shows an illustrative embodiment of a communication system 100. The system 100 comprises a controller 102 and a plurality of communication nodes 104, 106, 108, 110 which are operatively coupled to each other. Each of the communication nodes 104, 106, 108, 110 comprises a first radio frequency (RF) communication unit configured to perform ranging sessions with an external communication device (not shown). The controller 102 is configured to create a logical subset of said communication nodes 104, 106, 108, 110 based on an indication of a channel quality between the communication nodes and the external communication device, wherein said indication of the channel quality has been obtained using a second RF communication unit comprised in each of said communication nodes. Furthermore, the controller 102 is configured to cause that only the communication nodes included in said logical subset perform said ranging sessions with the external communication device. In this way, only a subset of the communication nodes 104, 106, 108, 110 may have to be enabled or activated, while the communication quality is not significantly affected. This, in turn, facilitates reducing the power consumption of the system 100.

In one or more embodiments, the first RF communication unit is an ultra-wideband (UWB) communication unit or a Wi-Fi communication unit. In this way, the distance measurements performed during the ranging sessions may have a high accuracy.

Furthermore, in one or more embodiments, the second RF communication unit is a low-power communication unit. For example, the second RF communication unit may be a Bluetooth low energy (BLE) communication unit, an ultra-high frequency (UHF) communication unit, or a low frequency (LF) communication unit. In this way, the channel quality indication may be obtaining without consuming a high amount of power. In a practical implementation, one of said communication nodes comprises the controller. In this way, no separate device is needed for implementing the controller.

In one or more embodiments, the controller is configured to create said logical subset by comparing channel quality indicators provided by all communication nodes, and by including in said logical subset only communication nodes that have provided high channel quality indicators. In this way, the selection of a suitable subset of communication nodes is facilitated. Furthermore, in one or more embodiments, the communication nodes are configured to apply a normalization function to the channel quality indicators before providing said channel quality indicators to the controller. In this way, the controller may perform a better comparison of the channel quality indicators.

In one or more embodiments, if one or more channel quality indicators are equivalent, the controller is configured to include all communication nodes that have provided said equivalent channel quality indicators in the logical subset. Alternatively, if one or more channel quality indicators are equivalent, the controller may be configured to include none of the communication nodes that have provided said equivalent channel quality indicators in the logical subset. Alternatively, if one or more channel quality indicators are equivalent, the controller is configured to include randomly selected communication nodes that have provided said equivalent channel quality indicators in the logical subset. In this way, alternative strategies may be applied for selecting the subset in case some channel quality indicators have the same value. The choice of a suitable strategy may depend on the existence of any lower or upper limits to the number of used communication nodes, which may be dictated by the system design.

In a practical implementation, the indication of the channel quality is based on at least one of the following parameters: a received signal strength indicator, statistics or parameters characteristic for the communication channel, ranging results obtained using the second RF communication unit, a connection status between the communication nodes and the external communication device, and a bit error rate. The statistics or parameters characteristic for the communication channel may include, for example, a root-mean-square (RMS) delay spread, a number of multipath components, other parameters that can be extracted from a channel impulse response and parameters used to describe channel models (e.g., models such as the Saleh-Valenzuela model), as well as the variation of all the mentioned parameters over time. These parameters may provide an accurate indication of the channel quality. Furthermore, in a practical implementation, the controller is configured to create said logical subset using a configurable parameter M, wherein M is a number of communication nodes to be included in said subset and wherein M is smaller than or equal to the total number of communication nodes in the system. In this way, the number of communication nodes to be included in the logical subset may easily be configured.

Figure 2:
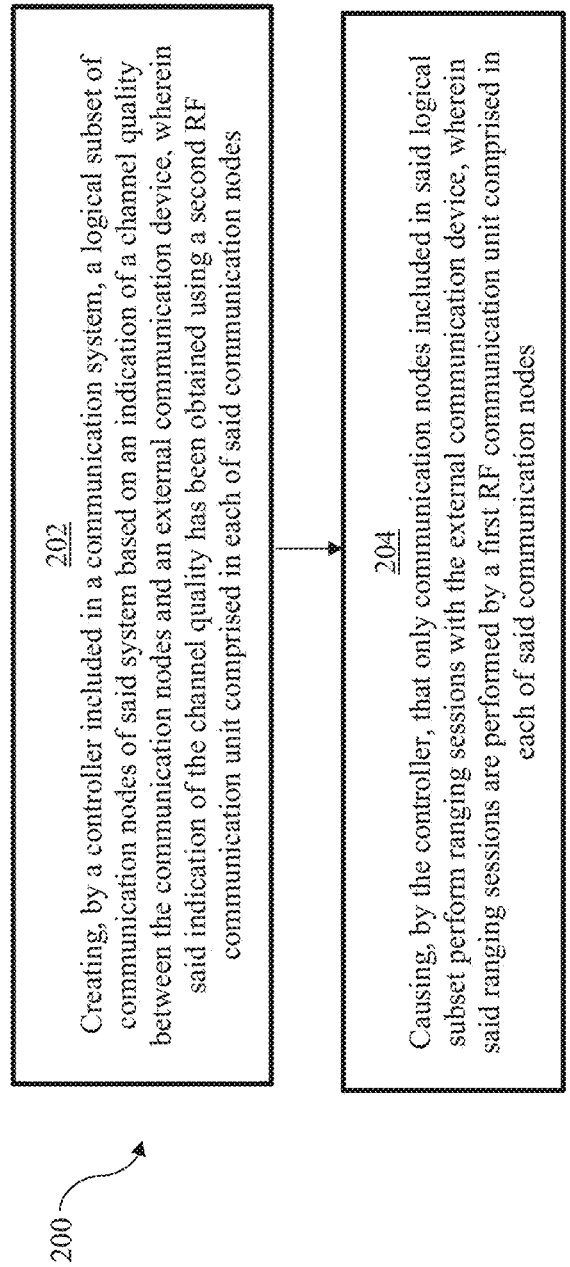
FIG. 2 shows an illustrative embodiment of a method of operating a communication system.

FIG. 2 shows an illustrative embodiment of a method 200 of operating a communication system. The method 200 comprises the following steps. At 202, a controller included in a communication system creates a logical subset of communication nodes of said system based on an indication of a channel quality between the communication nodes and an external communication device, wherein said indication of the channel quality has been obtained using a second RF communication unit comprised in each of said communication nodes. Furthermore, at 204, the controller causes that only communication nodes included in said logical subset perform ranging sessions with the external communication device, wherein said ranging sessions are performed by a first RF communication unit comprised in each of said communication nodes. In this way, only a subset of the communication nodes may have to be enabled or activated, while the communication quality is not significantly affected. This, in turn, facilitates reducing the power consumption of the system.

It is noted that the presently disclosed communication system may be implemented as a localization system that uses anchors (i.e., responder nodes) with two or more radios, e.g., one for low-power communication (e.g., BLE) and one for distance estimation (e.g., UWB). In that case, the communication nodes are implemented as anchors, the first RF communication unit is implemented as the distance estimation radio, and the second RF communication unit is implemented as the low-power communication radio. Thus, the channel information available from the low-power communication radio may be used to enable only the distance estimation radios of the responder nodes that have a high probability of delivering acceptable ranging results. It is noted that the ranging sessions are performed between these responder nodes and an initiator. Accordingly, the external communication device may be implemented as an initiator. The decentralized architecture allows to calculate channel quality indicators on each node independently, possibly using different methods optimized for the corresponding node. Since not all distance estimation radios need to be used to perform ranging, the overall power consumption and on-air time of the system may be reduced.

Furthermore, since the low-power communication radio may already be available in the nodes, in particular for the purpose of timing pre-synchronization and settings distribution, this may be achieved without significantly increasing the system complexity.

Furthermore, the whole process of responder device selection may be kept transparent to the initiator.

Localization systems of the kind set forth may use two radio technologies, one for low-power communication (e.g., BLE, UHF, LF) and one for the distance estimation (e.g., UWB, Wi-Fi). Typically, a separate distance estimation radio is used, because distance estimates delivered by low-power communication radios are often not as accurate and reliable as those provided by dedicated distance estimation radios. Nevertheless, also these low-power communication radios may deliver some communication channel information. Furthermore, the low-power communication radios are often already employed for other purposes, and already communicate with an external device, such that the communication channel information can be obtained without a significant increase in cost. To save power usually the distance estimation radios on the responder side (e.g., a car, infrastructure) are not constantly in receive mode to listen for ranging requests from initiator devices (e.g., a keyfob, a smartphone). Instead, the low-power communication radio is used for the initial communication with the initiator. After the responder and initiator aligned on the ranging settings and procedure via the low-power communication radio, the distance estimation radios are enabled to perform the ranging.

In accordance with the present disclosure, only the distance estimation radios may be enabled on those responder devices that have the highest probability of delivering reliable results, based on channel information obtained using the low-power communication radio link Therefore, no initial ranging by the distance estimation radios may be needed to take a decision. The number of responder devices that is allowed to enable their distance estimation radio can be set with a configurable parameter. Thus, the system may adapt itself to different environments and interference scenarios. The channel quality indicators, which are used to decide which devices should be used for the ranging, may be calculated decentralized on each responder node, possibly using different calculation methods which are optimized for the corresponding responder device. A list of the responder devices with the highest channel quality indicators may then be shared with the initiator. Using this approach, a localization system may enhance the quality of the ranging results, which results in a better localization accuracy for a given number of ranging rounds.

Accordingly, a simple system architecture may be realized, in which every responder device calculates the channel quality indicator autonomously. Then a list of responder devices that only contains the responder devices that should perform ranging (i.e., a subset of the kind set forth) is transmitted to the initiator. In this way, the responder device selection may be transparent to the initiator and the compatibility is maximized in case different types of responder devices are used. Furthermore, different low-power communication radio technologies may be used on the different responder devices to obtain the channel quality indicator, but still a normalized interface may be provided for the controller (e.g., a central responder device) communicating the list of devices to the initiator.

In an example a vehicle access system may comprise at least one initiator device and more than one responder device. The responder devices are examples of communication nodes of the kind set forth, while the initiator device is an example of an external communication device. For a car access application, typically 8 to 10 responder devices (i.e., anchors) are placed on a car. The initiator and the responder devices are equipped with at least one low-power communication radio (e.g., BLE, UHF, LF) and at least one distance estimation radio (e.g., UWB, Wi-Fi). The responder devices may be connected to each other through an in-band communication link or an out-of-band communication link.

The initiator may be searching for responder devices. For this purpose, the low-power communication link may be used. The low-power communication link may also be used to align on the forthcoming ranging procedure. In accordance with the present disclosure, channel information may be gathered by the low-power communication radio, which is then available for each responder-initiator pair. This information can be gathered either by active communication or passive listening or sniffing. The channel information may have different contents and formats. Non-limiting examples of the channel information are: a received signal strength indicator (RSSI), statistics or parameters characteristic for the communication channel, coarse ranging results obtained through the low-power communication link, a connection status between initiator and responder on the low-power communication radio (e.g., connection established, or connection failed), and a bit error rate (BER). The statistics or parameters characteristic for the communication channel may include, for example, a root-mean-square (RMS) delay spread, a number of multipath components, other parameters that can be extracted from a channel impulse response and parameters used to describe channel models (e.g., models such as the Saleh-Valenzuela model), as well as the variation of all the mentioned parameters over time.

Based on one or more of the above-mentioned parameters a channel quality indicator Q for each responder-initiator pair may be calculated on the corresponding responder device. Each device may use a different method to calculate the channel quality indicator, which can be optimized for the corresponding responder device. To ensure compatibility of the different channel quality indicators, they may be normalized in a predefined manner. For instance, the factors may be normalized to a range from 0 to 1. In general, any normalization convenient for the system design may be chosen, provided that it is the same on all responder devices. A responder device with a low-power communication radio link to the initiator gathers the channel quality indicators of all responder devices via an in-band link or an out-of-band link; this responder may be referred to as the central responder device. Then the central responder device may send a list with M out of N responder devices with the highest quality indicator to the initiator, to perform the ranging using the distance estimation radio. To let the other responder devices, know if they need to enable their distance estimation radio, this listmayalsobedistributedtotheotherresponderdevicesusingthein-bandlinkorout-of-bandlink. In this example, M is a number smaller than or equal to N, which specifies the number of responders that should be used for the ranging. The number M can be set statically or determined by the system during runtime. By setting M equal to N the system may effectively operating using all responder devices, thus allowing that the system at least temporarily operates without a reduced number of active nodes.

The channel quality indicator Q may for example be calculated in the following manner:
RSSI→Q=f(RSSI)(a normalization function for the RSSI value);
combination of different parameters or channel statistics→Q=f($\vec{x}$) (a function combining one or more parameters in a meaningful way to a single value in the range from 0 to 1);
connection status between initiator and responder device→no connection: Q=0, connection: Q=1;
bit error rate→Q=1−BER (lower bit error rates correspond to a better channel, bit error rates are already values in the range from 0 to 1).

It is noted that even if two responder devices use the same parameter (e.g., the RSSI value), the normalization function may be different on the two devices. This may be used to account for responder device-specific behavior (e.g., using different limits for the RSSI value) or if responder devices of different types are used.

In some cases, the channel quality indicator Q for two or more responder devices might be equal, but including all those responder devices in the subset would cause the number of responder devices to exceed M. In this case one of the following strategies may be applied:
use none of the responder devices with equal Q, resulting in a number of used responder devices lower than M;
use all of the responder devices with equal Q, resulting in a number of used responder devices higher than M.
select random responder devices to have a number of used responder devices equal to M.

Which of the above methods should be used depends on the existence of any lower or upper limits to the number of used responder devices, which may be dictated by the system design.

Figure 3:
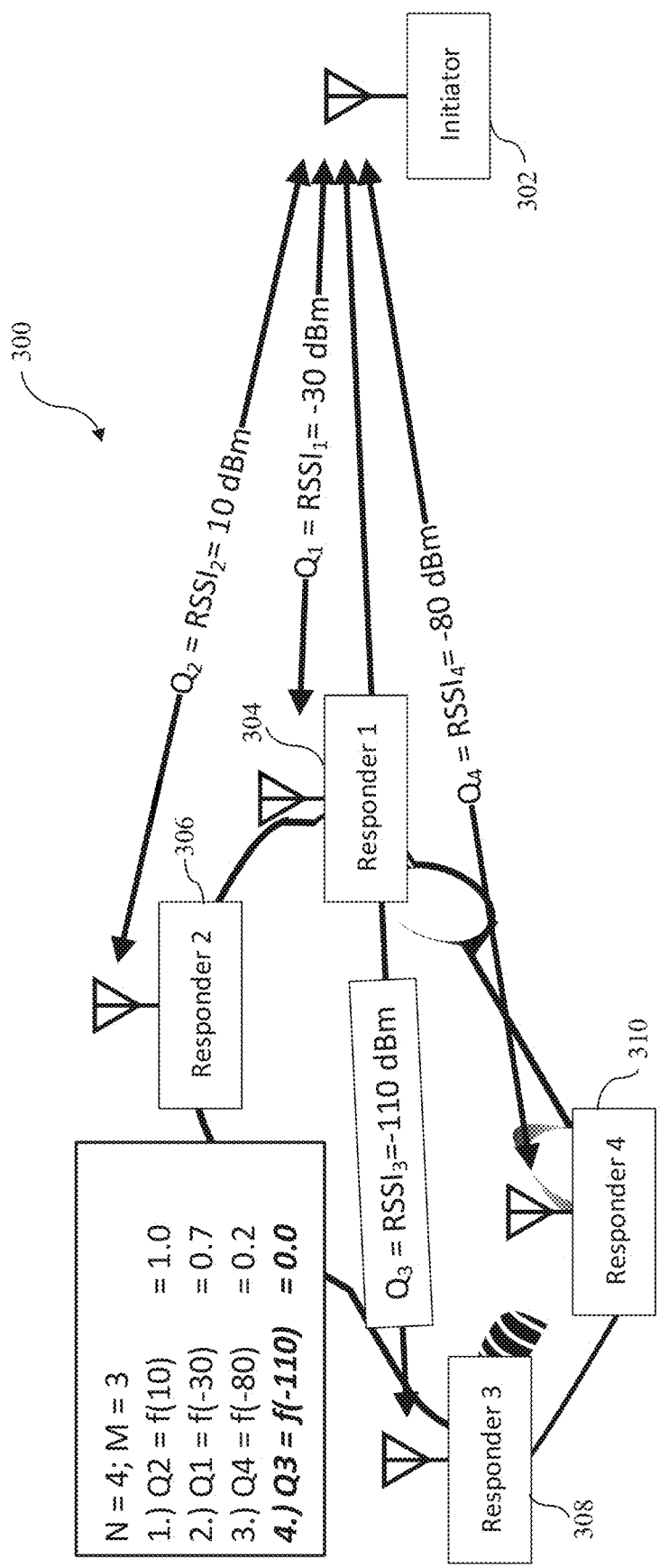
FIG. 3 shows an illustrative embodiment of a vehicle access system.

FIG. 3 shows an illustrative embodiment of a vehicle access system 300. The system 300 comprises an initiator 302 and a plurality of responder nodes (i.e., responder devices) 304, 306, 308, 310 of the kind described above. The plurality of responder nodes 304, 306, 308, 310 may form part of a communication system of the kind set forth. The communication system may further include a controller (not shown), which may be implemented in one of the responder nodes. Furthermore, the initiator 302 is an example of an external communication device of the kind set forth. In particular, an example is shown of how channel quality indicators may be calculated based on RSSI values. According to this example, all responder devices 304, 306, 308, 310 use the same normalization function f(RSSI), which is defined in Equation 1 below. In this function, functions min and max are used to limit the RSSI value to a range from value −100 to value 0. The output of the function is a normalized value in the range from 0 to 1.

$$f(RSSI) = \frac{100 + \min([\max([RSSI, -100]), 0])}{100} \quad \text{(Equation 1)}$$

More specifically, FIG. 3 shows an example of a responder device selection based on a channel quality indication, resulting in the use of 3 responder devices out of a total number of 4 responder devices (i.e., M=3 and N=4). According to this example, the RSSI value of the low-power communication link is used to calculate the channel quality indicator. The M responders with the highest RSSI values are the responders 1, 2 and 4. Only these responders will enable their distance estimation radios to perform ranging. Responder 3 will not enable its distance estimation radio, because it is among the N-M responders with the lowest quality indicator values.

Figure 4:
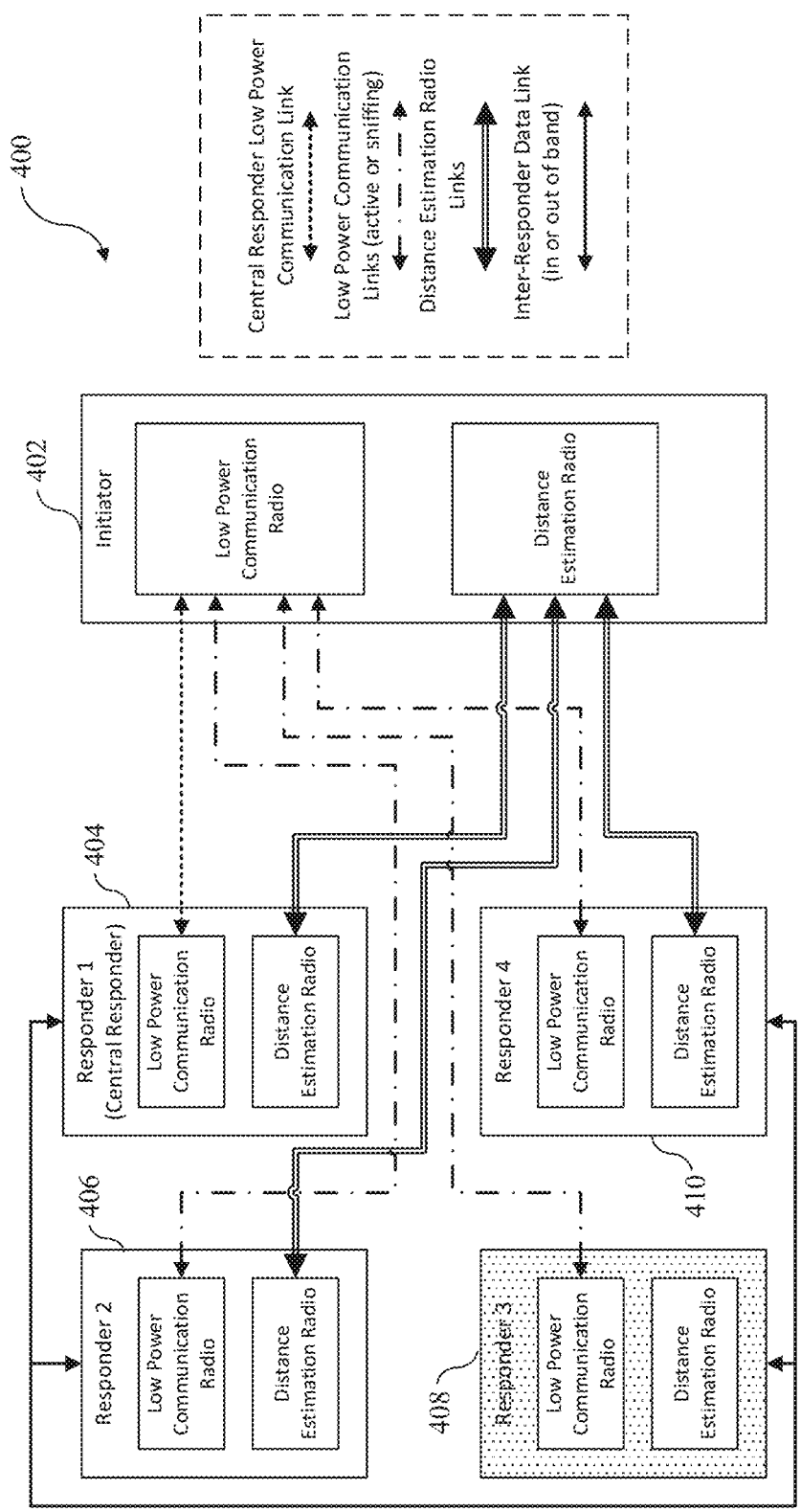
FIG. 4 shows another illustrative embodiment of a vehicle access system.

FIG. 4 shows another illustrative embodiment of a vehicle access system 400. The system 400 comprises an initiator 402 and a plurality of responder nodes (i.e., responder devices) 404, 406, 408, 410 of the kind described above. The plurality of responder nodes 404, 406, 408, 410 may form part of a communication system of the kind set forth. The communication system may further include a controller (not shown), which may be implemented in the "Central Responder" 404. Furthermore, the initiator 402 is an example of an external communication device of the kind set forth. In particular, an example is shown of a system architecture that corresponds to the setup presented in FIG. 3, but now showing the data links between the different nodes. As shown, responder 3 does not open a "Distance Estimation Radio Link" to the initiator 402, because it was among the N-M responder devices with the lowest channel quality indicator.

In a detailed implementation, the following steps may be performed to enable ranging sessions in the vehicle access system shown in FIG. 3 and FIG. 4. The different communication links are labeled as shown in FIG. 4.

1. One or more responders are listening for initiator requests on the low-power communication link
2. The initiator opens the communication to a responder via the low-power communication link One of the responder devices is chosen to be the "Central Responder" with the "Central Responder Low Power Communication Link" to the initiator.
3. Initiator and responders exchange general information and timing pre-synchronization, which is typically needed to perform the forthcoming ranging procedure. All the responders gather information on the communication channel between themselves and the initiator via their "Low Power Communication Links". For this purpose, it might be enough to listen to or sniff the communication between another responder and the initiator.
4. Each responder calculates the quality indicator of its "Low Power Communication Link" channel to the initiator.
5. The "Central Responder" device receives the channel quality indicators of all responder devices via the "Inter-Responder Data Link".
6. The "Central Responder" device generates a list of the quality indicators of all responders. Then the M responder devices with the highest quality indicators are selected and communicated to the initiator using the "Central Responder Low Power Communication Link" and to all other responder devices via the "Inter-Responder Data Link".
7. The M responder devices with the highest quality factors activate their distance estimation radios according to the agreed schedule from step 3.
8. The initiator performs ranging with the M responder devices.
9. The ranging results are processed and distributed in an appropriate way, which may depend on specific requirements imposed by the application.

It is noted that the steps 4, 5 and 6 may occur at the same time as step 3, depending on when the channel information for a given responder becomes available. Accordingly, it may be possible to append the channel quality indicators to already existing data packets for distribution.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory(RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 communication system
102 controller
104 communication node
106 communication node
108 communication node
110 communication node
200 method of operating a communication system
202 creating, by a controller included in a communication system, a subset of communication nodes of said system based on an indication of a channel quality between the communication nodes and an external communication device, wherein said indication of the channel quality has been obtained using a second RF communication unit comprised in each of said communication nodes
204 causing, by the controller, that only communication nodes included in said subset perform ranging sessions with the external communication device, wherein said ranging sessions are performed by a first RF communication unit comprised in each of said communication nodes
300 vehicle access system
302 initiator
304 first responder
306 second responder
308 third responder
310 fourth responder
400 vehicle access system
402 initiator
404 first responder
406 second responder
408 third responder
410 fourth responder

The invention claimed is:

1. A communication system, comprising:
a plurality of communication nodes which are operatively coupled to each other, wherein each of said communication nodes comprises a first radio frequency, RF, communication unit configured to perform ranging sessions with an external communication device;
a controller configured to create a logical subset of said communication nodes based on an indication of a channel quality between the communication nodes and the external communication device, wherein said indication of the channel quality has been obtained using a second RF communication unit comprised in each of said communication nodes;
the controller further being configured to cause that only the communication nodes included in said logical subset perform said ranging sessions with the external communication device.

2. The system of claim 1, wherein the first RF communication unit is an ultra-wideband, UWB, communication unit or a Wi-Fi communication unit.

3. The system of claim 1, wherein the second RF communication unit is a low-power communication unit, wherein the second RF communication unit is one of a Bluetooth low energy, BLE, communication unit, an ultra-high frequency, UHF, communication unit, or a low frequency, LF, communication unit.

4. The system of claim 1, wherein one of said communication nodes comprises the controller.

5. The system of claim 1, wherein the controller is configured to create said logical subset by comparing channel quality indicators provided by all communication nodes, and by including in said logical subset only communication nodes that have provided high channel quality indicators.

6. The system of claim 5, wherein the communication nodes are configured to apply a normalization function to the channel quality indicators before providing said channel quality indicators to the controller.

7. The system of claim 6, wherein, if one or more channel quality indicators are equivalent, the controller is configured to include all communication nodes that have provided said equivalent channel quality indicators in the logical subset.

8. The system of claim 6, wherein, if one or more channel quality indicators are equivalent, the controller is configured to include none of the communication nodes that have provided said equivalent channel quality indicators in the logical subset.

9. The system of claim 5, wherein, if one or more channel quality indicators are equivalent, the controller is configured to include all communication nodes that have provided said equivalent channel quality indicators in the logical subset.

10. The system of claim 5, wherein, if one or more channel quality indicators are equivalent, the controller is configured to include none of the communication nodes that have provided said equivalent channel quality indicators in the logical subset.

11. The system of claim 5, wherein, if one or more channel quality indicators are equivalent, the controller is configured to include randomly selected communication nodes that have provided said equivalent channel quality indicators in the logical subset.

12. The system of claim 5, wherein one of said communication nodes comprises the controller.

13. The system of claim 5, wherein the controller is configured to create said logical subset using a configurable parameter M, wherein M is a number of communication nodes to be included in said logical subset and wherein M is smaller than or equal to the total number of communication nodes in the system.

14. The system of claim 1, wherein the indication of the channel quality is based on at least one of the following parameters:
a received signal strength indicator;
statistics or parameters characteristic for the communication channel; ranging results obtained using the second RF communication unit;
a connection status between the communication nodes and the external communication device;
a bit error rate.

15. The system of claim 1, wherein the controller is configured to create said logical subset using a configurable parameter M, wherein M is a number of communication nodes to be included in said logical subset and wherein M is smaller than or equal to the total number of communication nodes in the system.

16. A method of operating a communication system, the system comprising a plurality of communication nodes which are operatively coupled to each other and a controller, wherein each of said communication nodes comprises a first radio frequency, RF, communication unit, the method comprising:
  creating, by the controller, a logical subset of said communication nodes based on an indication of a channel quality between the communication nodes and an external communication device, wherein said indication of the channel quality has been obtained using a second RF communication unit comprised in each of said communication nodes;
  causing, by the controller, that only communication nodes included in said logical subset perform ranging sessions with the external communication device, wherein said ranging sessions are performed by the first RF communication unit.

17. The method of claim 16, wherein the first RF communication unit is an ultra-wideband, UWB, communication unit or a Wi-Fi communication unit.

18. The method of claim 16, wherein the second RF communication unit is a low-power communication unit, wherein the second RF communication unit is one of a Bluetooth low energy, BLE, communication unit, an ultra-high frequency, UHF, communication unit, or a low frequency, LF, communication unit.

* * * * *